A. G. HEYERDAHL.
SUSPENSION DEVICE FOR USE IN SKINNING SMALL ANIMALS.
APPLICATION FILED JAN. 24, 1911.
1,027,335.  Patented May 21, 1912.
Fig. 1.
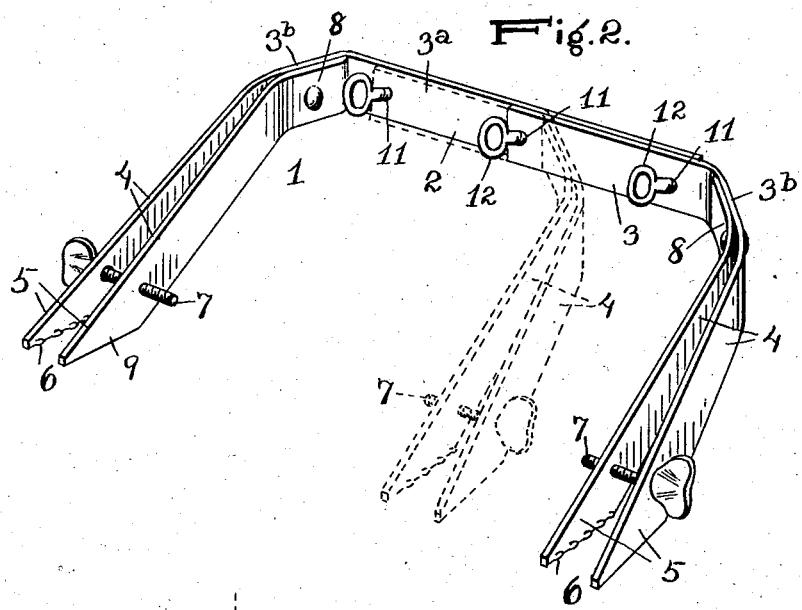
Fig. 2.
Fig. 3.
Witnesses
Stuart Hilder.
Frances W. Anderson.
Inventor
Albert G. Heyerdahl,
by E. W. Anderson & Son
his Attorneys

UNITED STATES PATENT OFFICE.

ALBERT G. HEYERDAHL, OF ORFORDVILLE, WISCONSIN.

SUSPENSION DEVICE FOR USE IN SKINNING SMALL ANIMALS.

1,027,335.         Specification of Letters Patent.         Patented May 21, 1912.

Application filed January 24, 1911. Serial No. 604,457.

*To all whom it may concern:*

Be it known that I, ALBERT G. HEYERDAHL, a citizen of the United States, resident of Orfordville, in the county of Rock and State of Wisconsin, have made a certain new and useful Invention in Suspension Devices for Use in Skinning Small Animals; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied. Fig. 2 is a perspective view of the invention on a larger scale. Fig. 3 is an end view of the invention.

The invention has relation to a suspension device or means for suspending small animals, for use in skinning the same, and it consists in the novel construction and combinations of parts as hereinafter set forth.

In the accompanying drawings, illustrating the invention, the numeral 1 designates a substantially U-form frame, the rear support 2 of which is adapted to abut against and be secured to a vertical wall. This support carries at each end thereof forward extending normally divergent planular spring jaw members 4, 4, the divergence of which begins approximately at said support and increases toward the outer or free ends of the members. The jaw members are provided with tapering free ends 5, 5, of gradually decreasing width, having inward projecting teeth 6, 6. The jaw members are drawn together upon the work or the legs of the animal by clamp bolts 7, 7 engaging the members in rear of the tapered ends thereof and intermediately of the length of the members.

It is preferred to form the support 2 in sections 3, 3ᵃ, which are capable of extension with relation to each other. It is also preferred to form the support 2 with oblique ends or corners 3ᵇ, to which oblique inner ends 8 of the inner of the jaw members are secured, to increase the strength of the spring action of the jaw members.

The horizontal sections 3, 3ᵃ lap one over the other as shown, one section 3ᵃ being preferably longer than the other section 3 and both sections being perforated at 11, 11 for the engagement of securing bolts or screw-eyes 12, 12, which engage registering perforations of the two arms and hold the device in position upon a fence, the side of a barn or other place. The lapping sections 3, 3ᵃ have a sliding adjustment to bring the outward extending arms nearer together or farther apart, to accommodate animals of varying sizes.

In the use of the invention the hind legs of the animal to be skinned are engaged between the tapered toothed portions of the jaws, when the screw-bolts are tightened to bring said jaws together upon the hind legs, which, owing to the space between the two pairs of jaws, are held apart, with the body of the animal suspended in a position removed from the supporting fence or bar, whereby the skinning operation is facilitated. In skinning a small animal, the legs are engaged with the forward smaller ends of the tapered jaws, whereby a larger portion of the fur or skin of the legs is made available for use. In skinning a larger animal the legs are pressed inward between the jaws in engagement with the larger rear ends of said jaws, whereby a larger clamping surface of the jaws comes into use, and the legs of the larger animal will have a sufficient portion of the skin or fur thereof available for use.

The invention is of simple and durable nature, composed of few parts, easily assembled, and will be found of advantage for the purpose in view.

Having thus described my invention, what I claim as new and desire to secure by Letters Patent is:

A hanger, comprising a support adapted to abut against and be rigidly secured to a vertical wall, opposite pairs of forward extending planular normally divergent spring jaw members having rigid connection with said support, the divergence of said members beginning approximately at said support and increasing toward the outer ends of the members, said jaw members having tapered outer end portions of gradually decreasing width, having inward-projecting teeth, and means for closing the jaw members upon the work engaging the members in rear of the tapered ends and intermediately of the length of the members.

In testimony whereof I affix my signature, in presence of two witnesses.

ALBERT G. HEYERDAHL.

Witnesses:
H. C. TAYLOR,
ETHEL COMPTON.

Copies of this patent may be obtained for five cents each, by addressing the "Commissioner of Patents, Washington, D. C."